Sept. 7, 1926.  
S. HILLER  
1,598,967  
PROCESS OF REVIVIFYING SPENT FILTERING MATERIALS  
Filed Dec. 21, 1923
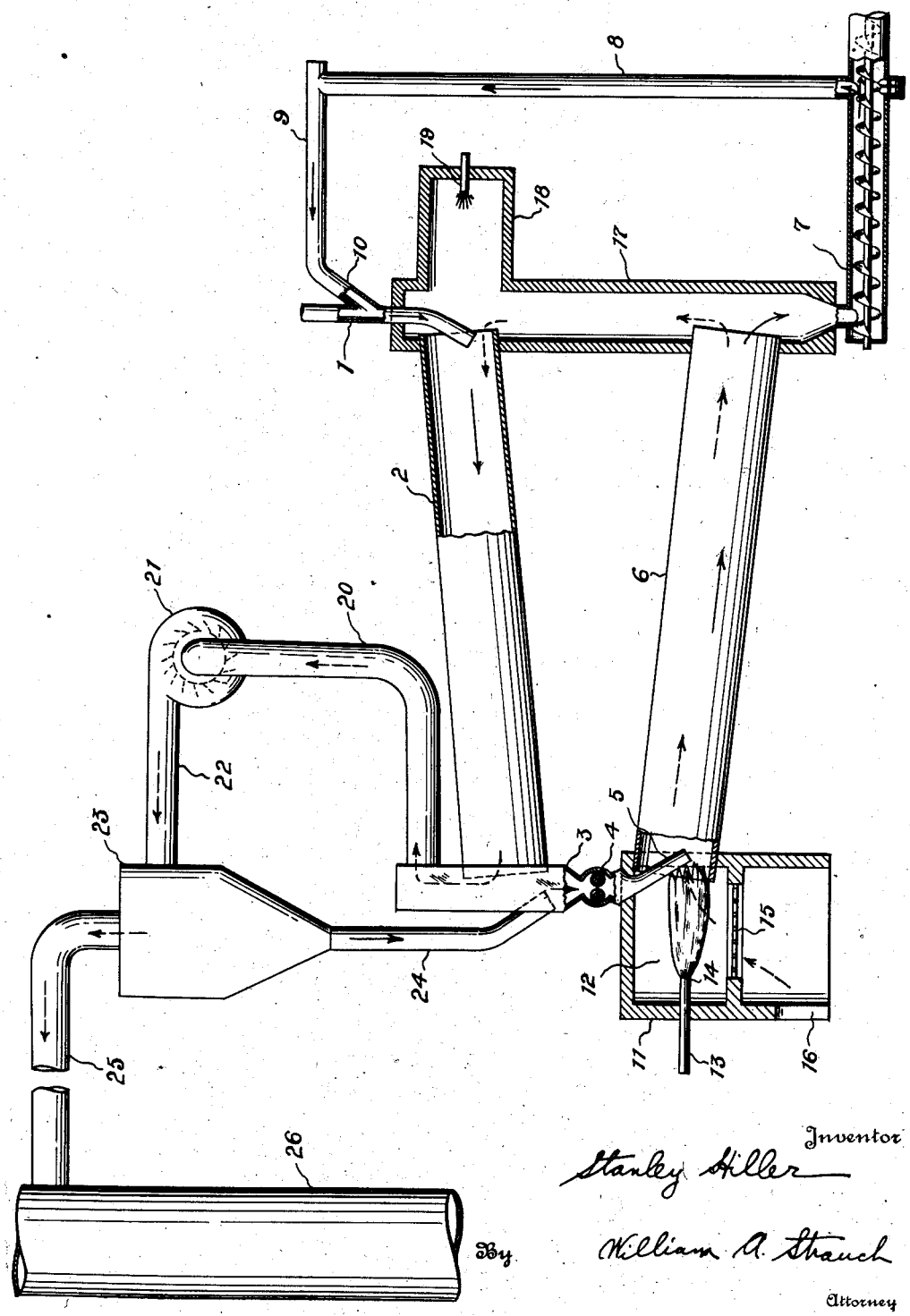
Inventor  
Stanley Hiller  
By William A. Strauch  
Attorney Patented Sept. 7, 1926.

1,598,967

UNITED STATES PATENT OFFICE.

STANLEY HILLER, OF SAN FRANCISCO, CALIFORNIA, ASSIGNOR TO STANLEY HILLER, INC., OF SAN FRANCISCO, CALIFORNIA.

PROCESS OF REVIVIFYING SPENT FILTERING MATERIALS.

Application filed December 21, 1923. Serial No. 682,062.

The present invention relates to an improved process for revivifying spent filtering materials, such for example as are used in filtering operations in sugar, oil and like industries. The present application is a continuation in part of application Serial No. 488,251, filed July 28, 1925, and contains all of the subject matter of the said application together with additional and more specific details regarding the invention as originally set forth in said application.

More particularly the invention relates to a process of revivifying and reactivating filtering materials, for example, such as kieselguhr, fuller's earth, asbestos and the like, the pores or cells of which have become clogged with impurities from filtering or bleaching operations to such an extent as to be substantially useless in further filtering operations.

Although adapted for use in a batch process, in the preferred embodiment of the invention, the process is continuous. It is to be understood however, that the invention is not limited to a continuous process.

Broadly the process comprises initiating combustion of the combustible and carbonaceous materials contained in the spent materials by the application of heat, and when the carbonaceous material is ignited, propagating combustion or burning out thereof by causing and allowing a combustion supporting gas to intimately contact with the ignited mass.

The degree of removal of carbonaceous material from the pores of the filtering material is controlled and regulated by regulating the supply of combustion supporting fluid to the ignited mass. In this manner the porosity of the revivified product is controlled and brought to a desired degree. Fine and coarse filtering material may be in this manner produced, depending on the degree of removal attained in the pores and cells. It will be understood that the burning out or removal may be carried to completion if desired, or may be merely partial. The finer grades, or those in which removal is merely partial, are valuable in filtering operations where a bleaching effect is desired, and may be used as an aid to, or even to replace bleaching filters.

As the process is carried out, the refuse, organic matter, and carbonaceous material in the pores are first ignited by the application of heat, preferably by the application of a direct flame, and after ignition has been effected, further combustion is caused and propagated though the mass by contacting the mass with a current of air. Experimentation has shown that in order to propagate combustion, the current of air must be preheated at least to the temperature of ignition of the mass before contact, otherwise the mass is cooled and combustion will not spread or be propagated through the mass.

In plants or establishments where great quantities of filtering materials are used, the rapidity with which the process may be carried out becomes important. It is found that the process is expedited materially by subjecting the spent filtering materials to a preheating operation prior to the application of heat for the purpose of igniting the refuse or carbonaceous materials for the burning out or removal thereof. In this manner moisture present in the spent materials, and easily volatilized constituents of the mass are driven off, and ignition is effected more rapidly than if the heat to effect ignition is also relied upon to preheat and dry the mass sufficiently to permit ignition. The preheating may be carried to the point of carbonizing the organic and refuse matter in the pores and cells of the mass.

To further expedite the handling of the material and to reduce operating costs, the process is adapted for continuous operation, and this is the preferred, but not the only manner of carrying out the process. In the continuous embodiment hereinafter disclosed, the spent material is subjected to a drying and preheating operation prior to ignition, and all of the steps are continuously carried out. The removal of the carbonaceous materials by burning out occurs in a rotary kiln in which a down draft, parallel to and in the direction of movement of the igniter mass is induced.

The figure of the drawing represents substantially in diagram the essential details and arrangement of a form of apparatus as used commercially to carry out the process of the invention.

It will of course be understood that the mechanical details of the apparatus form no part of the invention, and a wide choice may be had of well known forms of the dryer, kiln, furnaces, conveyors, fans, and all of the mechanical units, by those skilled in the art, without departing in any way from the scope and spirit of the invention. The present diagrammatic representation of apparatus has been made to show one of the preferred methods of carrying out the invention and many variations obviously may be made in the apparatus by those skilled in the art.

Referring to the drawing, 1 represents a feed chute through which the spent filtering material is fed into a rotary preheater, 2. Preheater 2 is rotated continuously by suitable and well known driving means and is given a downward pitch from the feed to the discharge end so that the materials will feed to the left in the figure at a suitable rate which may vary widely and is finally discharged into chamber 3 and falls by gravity between crusher rolls 4 which in turn are driven by suitable driving means and are arranged to crush any lumps or balls of the material which may have formed in preheater 2. Having passed through the crusher rolls 4, the materials are fed through a feed chute 5 to a rotary kiln 6. Kiln 6 is given a downward pitch and is rotated continuously by suitable driving means so that the material will pass therethrough at a suitable rate and finally discharges into a conveyor 7 which is driven by suitable means in a manner to carry the revivified material away from the apparatus to a mixer (not shown) where it is mixed to be again used for filtering. Part of the revivified material is discharged from conveyor 7 into a lifting conveyor 8 and is then delivered to a drag conveyor 9 whereby it is carried to a branch 10 of chute 1 and is mixed with the spent materials passing through 1 into preheater 2.

A furnace 11 is provided with a combustion chamber 12 in which a suitable fuel supply is adapted to be burned, as for example, a supply of oil fed through a feed pipe 13 to a burner 14. A grate 15 and regulating doorways 16 are preferably provided to control admission of air to the combustion chamber. Kiln feed chute 5 passes through chamber 12 and the upper end of kiln 6 projects into and communicates with this chamber, so that the heated products of combustion must pass down kiln 6.

The discharge end of kiln 6 and the feed end of preheater 2 project into a closed passage 17, through which the gases discharged from kiln 6, pass upward and then into and through preheater 2. A chamber 18 communicating with passage 17 is preferably, but not necessarily, provided and has disposed therein a burner 19 for oil or other fuel. Feed chute 1 passes through the upper end of chamber 17.

From the upper end of 3 a pipe or flue 20 leads to an exhaust or suction fan 21 of any well known construction and driven by suitable means to exert a suction which draws the heated air and gases from the combustion chamber, through the kiln, the preheater, and the various communicating passages. From fan 21 the discharge of the fan passes through flue 22 into a cyclone or other well known form of separator 23 in which the solid particles in the gases are separated and are passed through chute 24 back into chamber 3, while the gases themselves are forced out through flue 25 and pass into stack 26.

In operation and carrying out of the process, the spent filtering materials are preferably broken and crushed into small particles if not in this form, and are then fed into preheater 2 through chute 1. Burners 14 and 19 are ignited, and preheater 2, crusher rolls 4, kiln 6, conveyors 7, 8 and 9, and fan 21 are set into operation. The suction due to fan 21 draws air through the doorways 16 and grate 15 of the furnace into chamber 12 where it supports combustion of fuel from burner 14, and is heated thereby. From chamber 12 the heated air and products of combustion are drawn into and through kiln 6 parallel with the movement of the materials, through chamber 17, preheater 2 and then through flue 20 to fan 21. As the heated gases pass through preheater 2, the moisture present in the spent materials passing continuously through the preheater is driven off, and at the same time a substantial portion of the more volatile refuse matter and other foreign substances in the spent filtering material are driven off. In this manner the drying and carbonization proceeds progressively until the mass is discharged from the end of preheater into rolls 4, when the material is completely dried and the carbonization of the matter in the pores and cells is substantially complete, the moisture and more volatile contents having been driven off in the preheater. Owing to the amount of unconsumed combustible gases found present in the gases driven off in the preheater and kiln from the refuse, it is found desirable but not essential to place a small flame from burner 19 in the chamber 18. A sufficient quantity of oxygen is found present in the gases to support combustion of these unconsumed volatile components of the refuse, and of flame 19. The unconsumed combustible components are in this manner ignited and burn as they pass through the preheater. The heat produced by this combustion is utilized in drying the materials and carbonizing the organic matter or refuse. Waste of fuel is in this manner prevented.

In passing through the preheater, it is found that the materials have a tendency to form in lumps or balls. To break up these lumps, the mass is passed from the preheater through the crushing rolls 4 and is again reduced to a relatively uniform and finely divided mass. From the crushing rolls, the heated mass is passed through chute 5 and is dropped into the upper end of kiln 6. As the kiln is inclined and rotating, the mass will move to the right in the figure and at the same time will be turned over slowly and agitated.

The construction of furnace 11 and the relative proportions of the grates are such that an excess of air over and above that required to completely consume the fuel supplied through burner 14 is supplied, otherwise no oxygen could be present in kiln 6 to burn out the refuse, and to support combustion at burner 19 in chamber 18.

The amount of fuel supplied through burner 14 is regulated so that the temperature of the combustion chamber will be sufficiently high, and the air passing through the chamber will be heated to a temperature where the refuse in the materials will be ignited when discharged into the upper end of the kiln from chute 5, but the temperature at the upper end of the kiln is maintained at a temperature below which fusion of the filtering materials will occur. For efficient and economical operation, it is found advisable to impinge the flame on the material as it piles up at the mouth of chute 5 and to cause the current of air drawn in through grate 15 as shown by the dotted arrow, to pass directly through the flame zone. All of the fuel supplied through burner 14 is consumed in this manner in initiating combustion of the refuse contained within the pores of the spent material as it is fed into the kiln, owing to the excess of oxygen supplied through the grate. The air, after being initially heated in the flame and causing complete combustion of the fuel from burner 14, together with the products of combustion is drawn through the kiln as shown by the dotted arrows a path parallel to the movement of the ignited mass due to the powerful draft or suction created by fan 21. Combustion being continuously initiated as the materials are fed into the kiln, and the air drawn through grate 15 being heated to a temperature at which the initial combustion will be sustained, the heated air is drawn or forced into intimate contact with the ignited materials as they are turned over slowly and advanced along the kiln. The heat generated by the burning refuse is more than sufficient to sustain the combustion of the mass. The air is drawn around the particles and through the pores of the material, and the oxygen contained therein will cause the burning out of the refuse to the desired extent. In practical operation of the apparatus disclosed the temperature of the kiln actually increases as the burning material progresses through the kiln, and is highest at a point about three quarters along the length of the kiln. This increase in temperature along the kiln is due solely to the burning of the refuse and all other fuel is burned and consumed in the combustion chamber.

It will be noted that a large volume of air passes through the kiln without being drawn through the pores of or contacting with the particles of the material being treated. It will also be noted that the agitation of the mass due to the rotary movement of the kiln is relatively slow and that the major portion of the oxygen consumed in burning out the refuse, is drawn through the mass by the powerful suction which is the main factor in propagating combustion through the mass. The main function of agitation is to cause the feeding of the materials through the kiln, and the aid to combustion while important, is a subordinate function. For this reason no agitating members are used in the kiln, although such agitating members may be used in order to increase the agitation and thereby increase the capacity of the plant, by increasing the contacting action of the particles with the air.

The treated material passes through the kiln in the direction shown by the full line arrows and finally drops into conveyor 7. Conveyor 7 moves the material to vertical conveyor 8 where a part of the hot material is picked up and delivered to a drag conveyor 9 and is finally returned to chute 1 where it is mixed with the spent materials passing into the dryer for treatment. It is found in practice that this tailing back of part of the hot revivified material substantially aids the drying operation.

The main portion of the revivified material is carried by conveyor 7 to a mixer where it is properly mixed and prepared for further use. The details of the mixing operation form no part of the present invention, and the mixer has accordingly not been shown.

The heated gases from the kiln are drawn upward in 17, and the temperature is again raised to the ignition point of the unconsumed combustible elements of these heated gases by the flame from burner 19. The gases then are drawn through dryer 2 with the combustible elements burning, drying and preheating the materials passing through the preheater as above described. If the heat in the gases is insufficient for the preheating operation, more fuel may be supplied through 19.

From the preheater the gases are drawn through flue 20 by fan 21 and discharged into flue 22. Owing to the powerful draft from fan 21, a quantity of the crushed particles of the filtering material are carried in the gases. The gases are therefore passed through a separator or cyclone 25, and the entrained particles are removed being discharged through flue 24 into chamber 3. The gases pass upward through flue 25 and out through the stack.

Having described preferred forms of the invention, what is desired to be secured by Letters Patent and claimed as new is:—

1. In a continuous process for revivifying spent filtering materials, the step of continuously initiating the combustion of the carbonaceous materials retained within the pores of successive unignited portions thereof.

2. In a continuous process for revivifying spent filtering material, the steps of continuously initiating the combustion of the carbonaceous materials retained within the pores of successive unignited portions thereof, and propagating the combustion thereof by the circulation of a combustion supporting fluid therethrough.

3. In a continuous process for revivifying spent filtering materials, the steps of continuously initiating the combustion of the carbonaceous materials retained within the pores of successive unignited portions thereof, and then propagating combustion thereof by circulation of a combustion supporting fluid therethrough.

4. The process of revivifying spent filtering material, which comprises passing the said material progressively lengthwise through a heated zone in contact with the combustion products emitted from a combustion flame.

5. The process of revivifying spent filtering material which comprises passing the same progressively lengthwise through a heated zone in contact with combustion products emitted from a combustion flame and contacting the hot mass with a current of preheated combustion supporting gas.

6. The process as set forth in claim 5 in which the preheated gases travel in parallel with the movement of the heated mass.

7. The herein described process of revivifying spent filtering materials which comprises initiating the combustion of organic impurities contained in the spent materials by a flame, agitating the materials, and maintaining continued combustion of the organic impurities remaining in the materials by contacting the ignited mass with a current of air.

8. The herein described process of revivifying spent kieselguhr which comprises drying the kieselguhr, allowing a flame to play upon the dried kieselguhr to cause combustion of foreign matter in the kieselguhr, and continuously advancing the combustion of said foreign matter in the kieselguhr by subjecting the ignited mass of kieselguhr to a fluid medium containing oxygen while conveying the kieselguhr through a retort.

9. The herein described process of revivifying spent filtering materials which comprises preliminarily drying the materials, then allowing a flame to play upon the dried material to cause combustion of foreign matter contained therein, and contacting the ignited mass while in motion with a current of air in a manner to propagate the combustion of foreign matter throughout the mass.

10. The herein described process of revivifying spent filtering materials which comprises a continuous feeding of spent material through two communicating retorts, drying the material in the first retort, allowing a flame to play upon the dried material entering the second retort to cause an initial combustion of the foreign matter contained therein, continuously advancing combustion of said foreign matter in the moving material in the second retort by subjecting the ignited mass to a fluid medium containing oxygen, and passing the products of combustion from the second retort through the first retort for preliminarily drying spent material passing through the first retort.

STANLEY HILLER.